United States Patent
Kanai

(10) Patent No.: US 8,813,742 B2
(45) Date of Patent: Aug. 26, 2014

(54) HOT WATER FEEDER

(75) Inventor: Yasushi Kanai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1202 days.

(21) Appl. No.: 12/722,911

(22) Filed: Mar. 12, 2010

(65) Prior Publication Data

US 2010/0252029 A1 Oct. 7, 2010

(30) Foreign Application Priority Data

Apr. 3, 2009 (JP) .................. 2009-091565

(51) Int. Cl.
*F24J 2/30* (2006.01)
*F04B 49/00* (2006.01)
*F24D 11/00* (2006.01)
*F24D 19/10* (2006.01)

(52) U.S. Cl.
CPC ............... *F24D 11/003* (2013.01); *Y02B 10/20* (2013.01); *F24D 19/1042* (2013.01)
USPC .......................................... 126/643; 417/42

(58) Field of Classification Search
USPC ......... 126/572, 586, 588, 591, 609, 610, 595, 126/643, 585, 640, 641; 417/22, 42
See application file for complete search history.

(56) References Cited

U.S. PATENT DOCUMENTS

| | | | | |
|---|---|---|---|---|
| 4,034,738 A | * | 7/1977 | Barber, Jr. | 126/586 |
| 4,283,914 A | * | 8/1981 | Allen | 60/641.14 |
| 2004/0161340 A1 | * | 8/2004 | Rimkus et al. | 417/20 |
| 2006/0185626 A1 | * | 8/2006 | Allen et al. | 123/41.12 |
| 2009/0112758 A1 | * | 4/2009 | Herzig | 705/40 |

FOREIGN PATENT DOCUMENTS

JP 3140747 3/2008

* cited by examiner

*Primary Examiner* — Avinash Savani
*Assistant Examiner* — Vivek Shirsat
(74) *Attorney, Agent, or Firm* — Rankin, Hill & Clark LLP

(57) ABSTRACT

A hot water feeder in which a solar heat collector is used. The feeder has a first heat exchanger for heating a heat medium by solar heat, a second heat exchanger for heating water in a hot-water tank by the heated heat medium, and a heat exchange volume determination unit. The heat exchange volume determination unit calculates the flow rate of the heat medium circulating between the first and second heat exchangers on the basis of the detected temperature of the heat medium fed to the first heat exchanger and the rotational speed of a heat medium circulation pump, and calculates the heat exchange volume on basis of the flow rate and the temperature difference between the detected temperatures.

2 Claims, 3 Drawing Sheets

HOT WATER FEEDER

FIELD OF THE INVENTION

The present invention relates to a hot water feeder using a solar heat collector.

BACKGROUND OF THE INVENTION

Development of techniques for the effective use of solar heat has continued in recent years. Some of these techniques involve using a hot water feeder to heat water in a hot-water tank by solar heat recovered by a solar heat collector. The technique described in Japanese Utility Model Registration No. 3140747 is known as an example of such a hot water feeder.

The conventional hot water feeder is designed so that hot water heated by a solar heat collector is circulated by a pump and stored in a hot-water tank, and is provided with an incoming water pipe for feeding water to the hot-water tank from the outside, and a outgoing hot water pipe for delivering water from the hot-water tank to the outside. A feed water temperature sensor is mounted in the incoming water pipe, and an outgoing hot water temperature sensor and a flowmeter are mounted in the outgoing hot water pipe. A thermal energy meter calculates cumulative thermal energy on the basis of the temperature detected by the incoming water temperature sensor, the temperature detected by the outgoing hot water temperature sensor, and the flow rate measured by the flowmeter. Knowledge of the cumulative thermal energy allows the amount of substitute energy to be calculated.

To be used more widely, a hot water feeder must be designed with minimal costs. For this reason, it has been proposed to reduce the number of parts that do not directly contribute to the performance of the hot water feeder. A flowmeter is one such part that is relatively expensive. Costs are also involved in mounting the flowmeter in a pipe. On the other hand, it is preferable for the operator of a hot water feeder to have information about cumulative thermal energy.

SUMMARY OF THE INVENTION

It is therefore an object of the present invention to provide a technique capable of reducing the cost of a hot water feeder and present the user with information about the cumulative thermal energy generated by the hot water feeder.

According to the present invention, there is provided a hot water feeder for heating water in a water tank by circulating a heat medium, heated by solar heat collected by a solar heat collector, through the water in the water tank, which hot water feeder comprises: a first heat exchanger for exchanging heat to heat the heat medium by the solar heat collected by the solar heat collector; a second heat exchanger for exchanging heat to heat the water in the water tank by the heated heat medium; a feed pipe for feeding the heat medium from the second heat exchanger to the first heat exchanger; a return pipe for returning the heat medium heated by the first heat exchanger to the second heat exchanger; a heat medium circulation pump provided in the feed pipe; a first temperature detector for detecting a temperature of the heat medium fed from the second heat exchanger to the first heat exchanger; a second temperature detector for detecting a temperature of the heat medium returned from the first heat exchanger to the second heat exchanger; and a heat exchange volume determination unit, wherein the heat exchange volume determination unit calculates a flow rate of the heat medium circulating between the first and second heat exchangers on a basis of the temperature detected by the first temperature detector and a rotational speed of the heat medium circulation pump, and then calculates a volume of heat exchanged by the first and second heat exchangers on a basis of the flow rate and a temperature difference between the temperatures detected by the first and second temperature detectors.

In the present invention, the flow rate of the heat medium circulating between the first and second heat exchangers is calculated based on the temperature of the heat medium fed from the second heat exchanger to the first heat exchanger and the rotational speed of the heat medium circulation pump for feeding the heat medium from the second heat exchanger to the first heat exchanger.

The basic flow rate of the heat medium can be approximately determined in accordance with the rotational speed of the heat medium circulation pump. However, the density, viscosity, and other physical properties of the heat medium may fluctuate with the temperature of the heat medium being fed. It is therefore decided that a heat exchange volume determination unit calculate the flow rate of the heat medium on the basis of both the temperature of the heat medium and the rotational speed of the heat medium circulation pump in the above arrangement. It is possible, for example, to preset a map for calculating the flow rate of the heat medium on the basis of both the temperature of the heat medium and the rotational speed of the heat medium circulation pump, and to calculate the flow rate. A relatively accurate flow rate can thus be obtained quickly and appropriately because the flow rate of the heat medium can be calculated based both on the temperature of the heat medium and on the rotational speed of the heat medium circulation pump. In addition, the heat exchange volume determination unit calculates the volume of heat exchanged between the first and second heat exchangers on the basis of the resulting flow rate and the temperature difference between the temperatures detected by the first and second temperature detectors.

The cumulative thermal energy provided by the hot water feeder can thus be determined because the level of heat exchange can be obtained quickly and appropriately. In addition, there is no need to newly provide a separate flowmeter. The cost of the hot water feeder can therefore be reduced.

In a preferred form, the heat exchange volume determination unit calculates cumulative thermal energy by summarizing the heat exchange level (i.e., calculating the cumulative thermal energy by integrating the heat exchange volume).

The rotational speed of the heat medium circulation pump may be detected by a rotational speed detector.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
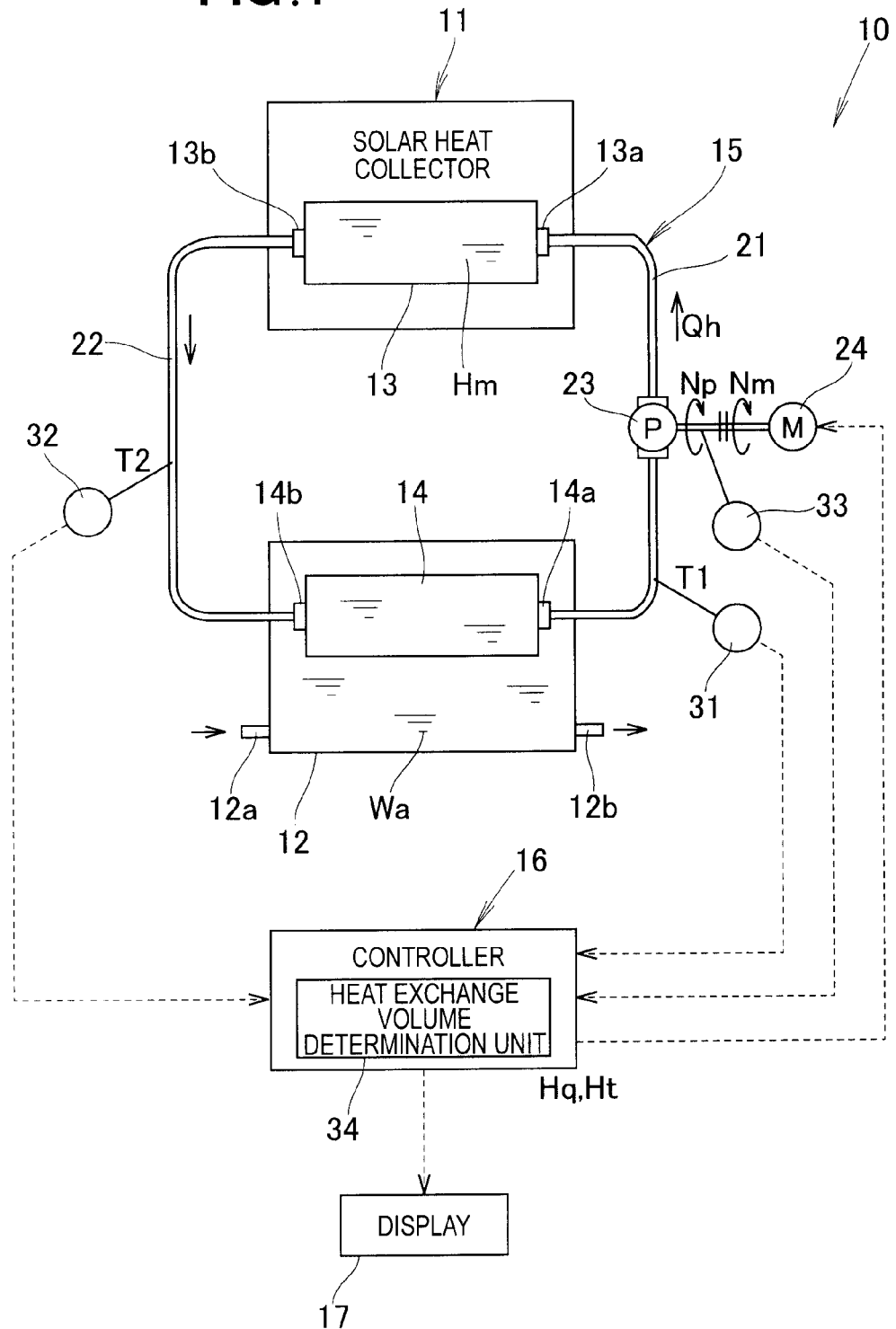
FIG. 1 is a schematic view illustrating a hot water feeder according to the present invention.

As shown in FIG. 1, a heat medium material Hm (referred to simply hereinbelow as a "heat medium Hm") heated by solar heat recovered in the solar heat collector 11 of a hot water feeder 10 is heated, and heat is applied to water Wa in a water or hot-water tank 12 by forcibly circulating the heat medium Hm. An antifreeze, water, or oil, for example, can be used as the heat medium Hm, but these are not the only options, and any fluid (liquid, gas) used to transfer heat may be used.

Specifically, the hot water feeder 10 has a solar heat collector 11, a hot-water tank 12, a first heat exchanger 13, a second heat exchanger 14, a heat medium circulation system 15, a controller 16, and a display 17.

The solar heat collector 11 converts solar energy into thermal energy and has a known structure. The first heat exchanger 13 exchanges heat so that the heat medium Hm is heated by the solar heat (thermal energy converted from solar energy) collected by the solar heat collector 11. The first heat exchanger 13 may be structured integrally with the solar heat collector 11 or may be placed as a separate unit in the vicinity of the solar heat collector 11.

The water Wa fed to an incoming water port 12a from the outside is stored in the hot-water tank 12, and the water Wa is heated via the second heat exchanger 14. The water Wa (hot water) is fed to the outside through an outgoing hot water port 12b. Heat is exchanged in the second heat exchanger 14 so that the water Wa in the hot-water tank 12 is heated by the heat medium Hm heated in the first heat exchanger 13. The second heat exchanger 14 may be structured integrally with the interior of the hot-water tank 12 or may be placed as a separate unit in the vicinity of the hot-water tank 12.

The heat medium circulation system 15 is a pipe for circulating the heat medium Hm between the first heat exchanger 13 and the second heat exchanger 14, and has a feed pipe 21, a return pipe 22, and a heat medium circulation pump 23.

The feed pipe 21 (primary pipe 21) is a pipe for feeding the heat medium Hm from the second heat exchanger 14 to the first heat exchanger 13, and the heat medium circulation pump 23 is interposed at an intermediate point in the pipe. The feed pipe 21 is disposed between the heat medium outlet 14a of the second heat exchanger 14 and the heat medium inlet 13a of the first heat exchanger 13. The heat medium circulation pump 23 is designed to deliver the heat medium Hm from the second heat exchanger 14 to the first heat exchanger 13, and is driven by a motor 24. The temperature T1 of the heat medium Hm in the feed pipe 21 is lower than the temperature T2 of the heat medium Hm in the return pipe 22. The heat medium circulation pump 23 is therefore placed in the lower-temperature feed pipe 21 to ensure greater durability.

The return pipe 22 (secondary pipe 22) is a pipe for returning the heat medium Hm heated by the first heat exchanger 13 to the second heat exchanger 14. The return pipe 22 is placed between the hot medium outlet 13b of the first heat exchanger 13 and the heat medium inlet 14b of the second heat exchanger 14.

The hot water feeder 10 thus configured operates in the following manner.

The driving of the heat medium circulation pump 23 causes the heat medium Hm to be fed from the second heat exchanger 14 to the first heat exchanger 13 through the feed pipe 21. The solar heat collector 11 collects solar energy and converts it to thermal energy. Heat is exchanged in the first heat exchanger 13 so that the heat medium Hm is heated by the thermal energy. The heat medium Hm heated in the first heat exchanger 13 is returned to the second heat exchanger 14 through the return pipe 22. Heat is exchanged in the second heat exchanger 14 so that the water Wa collected in the hot-water tank 12 is heated by the heat medium Hm. Water Wa in the hot-water tank 12 is thus heated by the forcible circulation of the heat medium Hm between the first heat exchanger 13 and the second heat exchanger 14. Water Wa (hot water) in the hot-water tank 12 is fed to the outside through the outgoing hot water port 12b.

A first temperature detector 31 is mounted in either one of the heat medium outlet 14a of the second heat exchanger 14, the heat medium inlet 13a of the first heat exchanger 13, or the feed pipe 21. The first temperature detector 31 detects the temperature T1 (feed temperature T1) of the heat medium Hm fed from the second heat exchanger 14 to the first heat exchanger 13 and generates a detection signal.

A second temperature detector 32 is mounted in either one of the hot medium outlet 13b of the first heat exchanger 13, the heat medium inlet 14b of the second heat exchanger 14, or the return pipe 22. The second temperature detector 32 detects the temperature T2 (return temperature T2) of the heat medium Hm returned from the first heat exchanger 13 to the second heat exchanger 14, and generates a detection signal.

The controller 16 controls the temperature of the water Wa in the hot-water tank 12 to keep the temperature at a predetermined level. The controller 16 receives detection signals from, for example, the first temperature detector 31, the second temperature detector 32, and the rotational speed detector 33, and controls the rotational speed Np of the heat medium circulation pump 23 by driving the motor 24 in a controlled manner.

The rotational speed detector 33 detects the rotational speed Np of the heat medium circulation pump 23 and generates a detection signal. An arrangement is adopted in the present example in which the rotational axle of the heat medium circulation pump 23 is directly connected to the motor axle of the motor 24 by coupling. The rotational speed Np of the heat medium circulation pump 23 is therefore the same as the rotational speed Nm of the motor 24. The rotational axle of the heat medium circulation pump 23 is not limited to the arrangement in which direct connection to the motor axle is provided, and may, for example, involve a belt-based link.

The controller 16 has a heat exchange volume determination unit 34. The heat exchange volume determination unit 34 is described in detail below.

The display 17 displays cumulative thermal energy on the basis of a display command from the controller 16.

Figure 2:
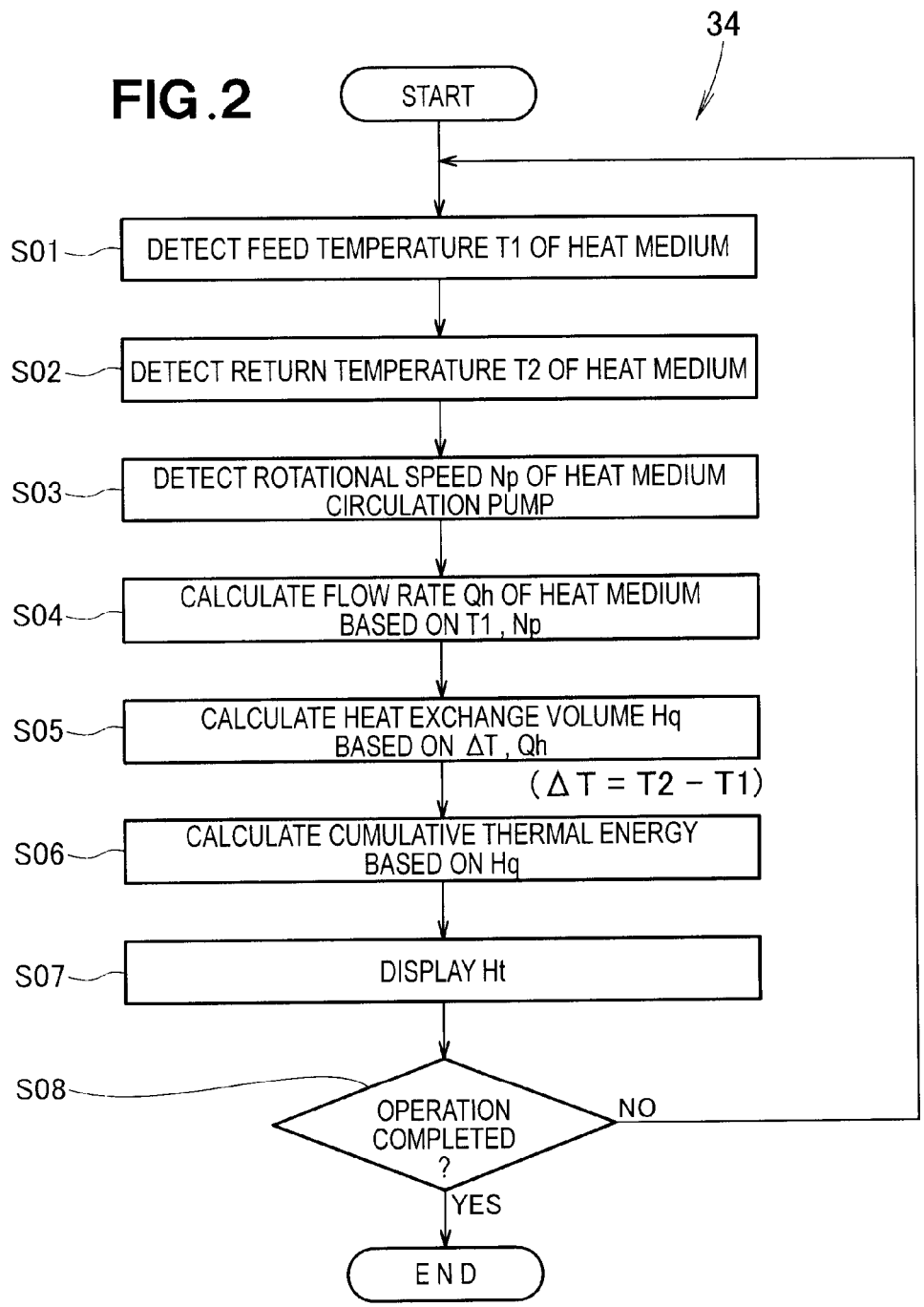
FIG. 2 is a control flowchart of the controller of FIG. 1.

A control flow in which microcomputer is used for the controller 16 will next be described based on FIG. 2 with reference to FIG. 1. FIG. 2 is a control flowchart showing an example of a heat exchange volume determination performed by the controller 16.

The controller 16 is started by closing a main switch (not shown). The temperature T1 (° C.), that is, the feed temperature T1, of the heat medium Hm detected by the first temperature detector 31 is first read (step S01).

The temperature T2 (° C.), that is, the return temperature T2, of the heat medium Hm detected by the second temperature detector 32 is then read (step S02).

The rotational speed Np (m/sec) of the heat medium circulation pump 23 detected by the rotational speed detector 33 is then read (step S03).

Figure 3:
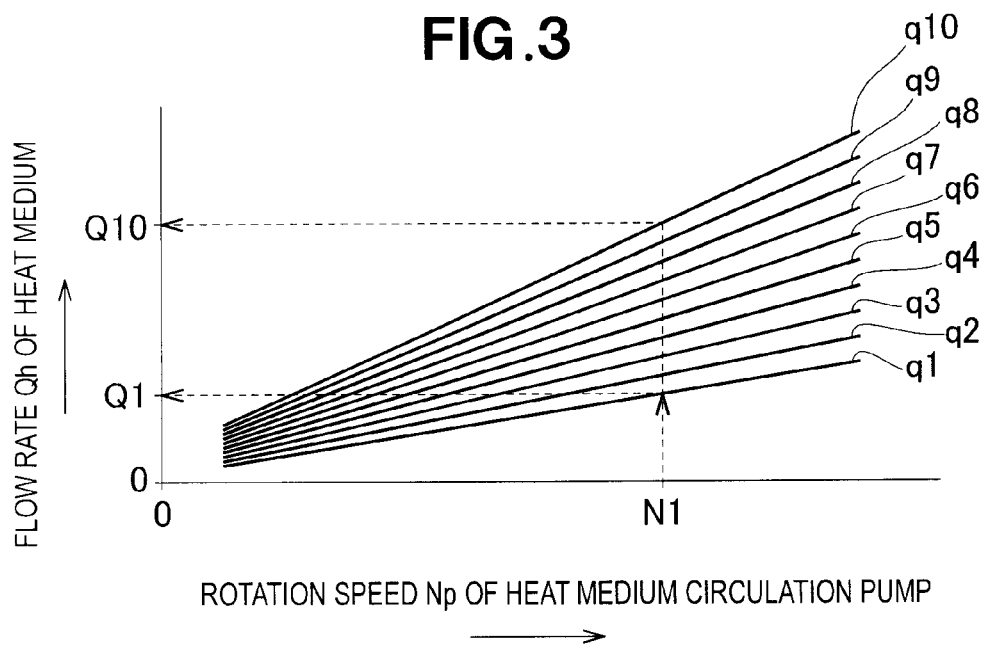
FIG. 3 illustrates a flow rate determination map for the controller of FIG. 1.

The flow rate Qh (m³/sec) of the heat medium Hm circulating between the first and second heat exchangers 12, 13 is then calculated based on the feed temperature T1 and the rotational speed Np of the heat medium circulation pump 23 (step S04). Since the heat medium circulation pump 23 is provided to the feed pipe 21, the flow rate Qh is also calculated based on the feed temperature T1. The flow rate determination map of FIG. 3 may, for example, be used to calculate the flow rate Qh. The flow rate determination map can be set by additionally including, for example, experimental data, empirical data, or the like in advance.

The flow rate determination map comprises a collection of a plurality of characteristic lines q1 to q10; the rotational speed Np of the heat medium circulation pump 23 is plotted on the horizontal axis; the flow rate Qh of the heat medium Hm is plotted on the vertical axis; and the flow rate Qh is calculated based on the rotational speed Np.

A line that corresponds to the feed temperature T1 is selected in this case from the plurality of characteristic lines q1 to q10. The characteristic lines q1 to q10 are preset so as to be mutually different depending on the magnitude of the feed temperature T1. The characteristics of the characteristic lines q1 to q10 vary in a stepwise fashion. For example, the first characteristic line q1 is selected when the feed temperature T1 is at the minimum level, and the tenth characteristic line q10 is selected when the feed temperature T1 is at the maximum level. Specifically, the characteristic lines are selected so that the flow rate Qh at a given rotational speed Np increases with increased feed temperature T1.

Thus, the reason that a plurality of characteristic lines q1 to q10 is prepared is that the viscosity and other physical properties of the heat medium Hm vary with the temperature T1 of the heat medium Hm (i.e., temperature-dependent physical properties including viscosity of the heat medium). Therefore, there are also variations in the pressure loss of the heat medium Hm flowing through the heat medium circulation system 15 between the first and second heat exchangers 13, 14. For this reason, the value of the flow rate Qh of the heat medium Hm flowing through the heat medium circulation system 15 varies even when the rotational speed Np remains the same. In the present example, the correct flow rate Qh can be calculated more precisely because a plurality of characteristic lines q1 to q10 that correspond to fluctuations in the feed temperature T1 is prepared.

In one example, the first characteristic line q1 is selected when the feed temperature T1 is at the minimum level, and the value of the flow rate Qh is therefore equal to Q1 when the value of the rotational speed Np is N1. On the other hand, the tenth characteristic line q10 is selected when the feed temperature T1 is at the maximum level, and the value of the flow rate Qh is therefore equal to Q10 when the value of the rotational speed Np is N1.

The volume of heat Hq exchanged by the first and second heat exchangers 12, 13 is then calculated based on the flow rate Qh and the temperature difference $\Delta T$ between the feed temperature T1 and return temperature T2 in the step S05 shown in FIG. 2. Since the heat medium Hm is heated by the first heat exchanger 13, the return temperature T2 following heating is higher (T2>T1) than the feed temperature T1 prior to heating. The temperature difference $\Delta T$ is calculated using the formula $\Delta T=T2-T1$.

The heat exchange volume Hq, that is, the heat exchange volume Hq (kcal/sec) per unit of time, is calculated by performing computations using, for example, the following general formula (1), where $\rho$ is the density (kg/m$^3$) of the heat medium Hm, and Cp is the specific heat (kcal/kg·° C.) of the heat medium Hm.

$$Hq = \Delta T \cdot Qh \cdot \rho \cdot Cp \tag{1}$$

Cumulative thermal energy Ht (kcal) is then calculated based on the heat exchange volume Hq (step S06). The term "cumulative thermal energy Ht" refers to the cumulative value of the heat exchange volume Hq from an arbitrary point in time (for example, a point in time selected by operating a setting switch not shown in the drawings) set by the user until the current point in time.

The cumulative thermal energy may be further converted to a predetermined energy level in step S06 by multiplying the value of the cumulative thermal energy Ht by a predetermined conversion coefficient Ki. For example, the cumulative thermal energy Ht (kcal) can be converted to cumulative thermal energy Ht (J) when the conversion coefficient Ki is set to $4.186\times10^3$ (J/kcal). Also, the cumulative thermal energy Ht (kcal) can be converted to cumulative thermal energy Ht (kw·h) when the conversion coefficient Ki is set to $1.163^{-3}$ (kw·h/kcal).

The value of the cumulative thermal energy Ht is then displayed on the display 17 (step S07). The user of the hot water feeder 10 can receive information about the value of the cumulative thermal energy Ht by viewing the display 17.

A decision is then made as to whether the operation of the hot water feeder 10 has ended; that is, whether the main switch (not shown) is on (step S08). If it is determined in Step S08 that the system is still operating, the sequence returns to step S01 and the control procedure continues. The control procedure based on the control flow is terminated when it is determined that the operation has ended.

The arrangement obtained by aggregating steps S01 to S08 constitutes the heat exchange volume determination unit 34, as described above.

A summary of the above description is given below.

In the present example, the flow rate Qh of the heat medium Hm circulating between the first and second heat exchangers 13, 14 is calculated based on the temperature T1 of the heat medium Hm supplied from the second heat exchanger 14 to the first heat exchanger 13, and on the rotational speed Np of the heat medium circulation pump 23 for feeding the heat medium Hm from the second heat exchanger 14 to the first heat exchanger 13.

The basic flow rate Qh of the heat medium Hm can be roughly determined in accordance with the rotational speed Np of the heat medium circulation pump 23. It should be noted that the density, viscosity, and other physical properties of the heat medium Hm somewhat vary in accordance with the temperature T1 of the heat medium Hm being fed. An arrangement was therefore adopted in which the flow rate Qh of the heat medium Hm is calculated based on the temperature T1 of the heat medium Hm and the rotational speed Np of the heat medium circulation pump 23 by the heat exchange volume determination unit 34. For example, a flow rate determination map (FIG. 3) for calculating the flow rate Qh of the heat medium Hm is preset based both on the temperature T1 of the heat medium Hm and on the rotational speed Np of the heat medium circulation pump 23, and the flow rate Qh is calculated. The flow rate Qh of the heat medium Hm is therefore calculated in this manner based both on the temperature T1 of the heat medium Hm and on the rotational speed Np of the heat medium circulation pump 23, allowing a comparatively accurate flow rate Qh to be obtained quickly and appropriately.

In addition, the heat exchange volume determination unit 34 calculates the volume of heat Hq exchanged by the first and second heat exchangers 13, 14 on the basis of the resulting flow rate Qh and the temperature difference $\Delta T$ between the temperatures T1 and T2 detected by the first and second temperature detectors 31, 32.

It is thus possible to obtain the heat exchange volume Hq quickly and appropriately, and therefore to acquire information about the cumulative thermal energy Ht provided by the hot water feeder 10. In addition, there is no need to newly provide a separate flowmeter. It is therefore possible to reduce the cost of the hot water feeder 10.

In the arrangement adopted in the present invention, the rotational speed Np of the heat medium circulation pump 23 is calculated directly or indirectly, but the options are not limited to the arrangement in which the speed is calculated by the rotational speed detector 33.

For example, it is possible to adopt an arrangement in which the motor 24 is a DC brushless motor, and a resolver or other rotation sensor is built into the DC brushless motor. The rotation sensor detects the rotation angle of the rotor in the motor 24. The rotational speed Np of the heat medium circulation pump 23 can be calculated based on a detection signal of the rotation sensor.

In addition, the rotational speed Np of the heat medium circulation pump 23 can be calculated based on the frequency of the drive electric current for driving the motor 24 by the controller 16 in cases in which the motor 24 is a DC brushless motor or an induction motor. For example, the rotational speed Nm of the motor can be calculated according to the following general formula (2) in the case of a DC brushless motor, where f is the frequency of the drive electric current, and p is the number of poles of the motor 24.

$$Nm = 120 f/p \qquad (2)$$

The rotational speed Nm of the motor can be calculated using the following general formula (3) by adding a frictional constant s ("frictional s") to formula (2) above.

$$Nm = (120 f/p) \cdot (1-s) \qquad (3)$$

Strictly speaking, the frictional constant s varies with the rotational speed Np of the heat medium circulation pump 23, the type and concentration of the heat medium Hm, which represents a load for the heat medium circulation pump 23, and the like. In view of this, the variations can be compensated by adding these variations in advance to the elements constituting the flow rate determination map of FIG. 3.

Furthermore, the rotational speed Np of the heat medium circulation pump 23 can be calculated based on the chive voltage for driving the motor 24 by the controller 16 when the motor 24 is a DC motor. The rotational speed Nm of such a DC motor is in a proportional relationship with the drive voltage E for driving the motor, and the rotational speed Nm of the motor can be calculated using the following formula (4), where Pw is the motor output, Tm is the motor torque, and I is the motor drive current.

$$Nm = (60 f / 2\pi) \cdot (Pw/Tm) = \qquad (4)$$
$$= (60 f / 2\pi) \cdot (I \cdot E/TM)$$

It is also possible to adopt an arrangement in which an engine is used instead of the motor 24 as the drive source for driving the heat medium circulation pump 23. In this case as well, the rotational speed Np of the heat medium circulation pump 23 can be calculated based on the rotational speed of the engine.

The hot water feeder 10 of the present invention can be commonly used in buildings and plants.

Obviously, various minor changes and modifications of the present invention are possible in light of the above teaching. It is therefore to be understood that within the scope of the appended claims the invention may be practiced otherwise than as specifically described.

What is claimed is:

1. A hot water feeder for heating water in a water tank by circulating a heat medium, heated by solar heat collected by a solar heat collector, through the water in the water tank, the hot water feeder comprising:

a first heat exchanger for exchanging heat to heat the heat medium by the solar heat collected by the solar heat collector;

a second heat exchanger for exchanging heat to heat the water in the water tank by the heated heat medium;

a feed pipe for feeding the heat medium from the second heat exchanger to the first heat exchanger;

a return pipe for returning the heat medium heated by the first heat exchanger to the second heat exchanger;

a heat medium circulation pump provided in the feed pipe;

a first temperature detector for detecting a feed temperature of the heat medium fed from the second heat exchanger to the first heat exchanger;

a second temperature detector for detecting a return temperature of the heat medium returned from the first heat exchanger to the second heat exchanger; and a heat exchange volume determination unit configured to calculate a flow rate of the heat medium circulating between the first and second heat exchangers on a basis of the feed temperature detected by the first temperature detector and a rotational speed of the heat medium circulation pump, then calculate a volume of heat exchanged by the first and second heat exchangers on a basis of the flow rate and a temperature difference between the feed and return temperatures detected by the first and second temperature detectors, and calculate cumulative thermal energy by integrating the heat exchange volume, wherein the heat exchange volume determination unit comprises a flow rate determination map used for determining the flow rate of the heat medium circulating between the first and second heat exchangers, the flow rate determination map comprising a collection of a plurality of straight characteristic lines with different inclinations, each of the straight characteristic lines representing a correlation between the rotational speed of the heat medium circulation pump and the flow rate of the heat medium circulating between the first and second heat exchangers, the plurality of straight characteristic lines being preset so as to be mutually different depending on a magnitude of the feed temperature of the heat medium, and the straight characteristic lines being selected so that the flow rate of the heat medium at a given rotational speed of the heat medium circulation pump increases with increased feed temperature of the heat medium so as to accommodate variations in the flow rate of the heat medium which occur when a pressure loss of the heat medium circulating between the first and second heat exchangers varies due to variations in temperature-dependent physical properties including viscosity of the heat medium even when the rotational speed of the heat medium circulation pump remains the same.

2. The hot water feeder of claim 1, wherein the rotational speed of the heat medium circulation pump is detected by a rotational speed detector.

* * * * *